(12) United States Patent
Hauser

(10) Patent No.: US 10,459,695 B2
(45) Date of Patent: Oct. 29, 2019

(54) CORRECTION OF CODE ERRORS USING MACHINE LEARNING

(71) Applicant: SAP SE, Walldorf (DE)

(72) Inventor: Stefan Hauser, Malsch (DE)

(73) Assignee: SAP SE, Walldorf (DE)

( * ) Notice: Subject to any disclaimer, the term of this patent is extended or adjusted under 35 U.S.C. 154(b) by 93 days.

(21) Appl. No.: 15/726,105

(22) Filed: Oct. 5, 2017

(65) Prior Publication Data

US 2019/0108001 A1   Apr. 11, 2019

(51) Int. Cl.
*G06F 9/44* (2018.01)
*G06F 8/30* (2018.01)
*G06F 11/36* (2006.01)
*G06N 20/00* (2019.01)

(52) U.S. Cl.
CPC ............ *G06F 8/30* (2013.01); *G06F 11/362* (2013.01); *G06F 11/3604* (2013.01); *G06F 11/3664* (2013.01); *G06F 11/3668* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,069,737 B1 * | 6/2015 | Kimotho | G06F 11/1484 |
| 9,164,753 B2 | 10/2015 | Shetty et al. | |
| 2006/0047617 A1 * | 3/2006 | Bacioiu | G06K 9/6262 |
| | | | 706/59 |
| 2016/0274998 A1 * | 9/2016 | Coyle | G06F 11/3664 |
| 2017/0308800 A1 * | 10/2017 | Cichon | G06N 20/00 |
| 2018/0210824 A1 * | 7/2018 | Kochura | G06F 11/3696 |
| 2018/0276562 A1 * | 9/2018 | Woulfe | G06N 20/00 |
| 2018/0285775 A1 * | 10/2018 | Bergen | G06F 16/35 |
| 2018/0293463 A1 * | 10/2018 | Brown | G06F 8/31 |
| 2018/0300227 A1 * | 10/2018 | Bergen | G06F 11/3688 |
| 2018/0365125 A1 * | 12/2018 | Mola | G06F 11/362 |
| 2018/0373986 A1 * | 12/2018 | Rainwater | G06N 3/084 |
| 2019/0066290 A1 * | 2/2019 | Shaubi | G06T 7/0004 |

OTHER PUBLICATIONS

Brownlee, J., "An Introduction to Feature Selection", retrieved from https://blogs.sap.com/2007/02/27/abap-does-it-have-a-compiler-or-an-interpreter/ on or before Oct. 2017, 22 pages.
"Comparing and Merging Files", retrieved from https://www.gnu.org/software/hello/manual/diff.html#Sample%20diff%20Input on or before Oct. 2017, 83 pages.

(Continued)

*Primary Examiner* — Insun Kang
(74) *Attorney, Agent, or Firm* — Klarquist Sparkman, LLP

(57) ABSTRACT

Techniques and solutions are described for detecting and correcting errors in software, such as in source code, using machine learning. A machine learning algorithm can be trained using source code, source code corrections, and extracted code features to provide a trained classifier. Test data, such as code to be scanned for errors or code known to have an error, can be submitted to the trained classifier. The classifier can generate a code correction or corrected code. Code corrections can be applied to the source code to provide corrected code.

19 Claims, 13 Drawing Sheets

(56) References Cited

OTHER PUBLICATIONS

"Curse of dimensionality", retrieved from https://en.wikipedia.org/wiki/Curse_of_dimensionality on or before Oct. 2017, 6 pages.
Domingos, P., "A Few Useful Things to Know about Machine Learning", retrieved from https://homes.cs.washington.edu/~pedrod/papers/cacm12.pdf on or before Oct. 2017, 9 pages.
Govind, P., "ABAP: Does it have a Compiler or an Interpreter?", retrieved from https://blogs.sap.com/2007/02/27/abap-does-it-have-a-compiler-or-an-interpreter/ on or before Oct. 2017, 10 pages.
Hardesty, L., "Recognizing Correct Code", retrieved from http://news.mit.edu/2016/faster-automatic-bug-repair-code-errors-0129 on or before Oct. 2017, 4 pages.
"How to manually implement the correction instructions 846826?" retrieved from https://archive.sap.com/discussions/thread/692611 on or before Oct. 2017, 7 pages.
"Introducing Machine Learning", retrieved from https://www.mathworks.com/content/dam/mathworks/tag-team/Objects/i/88174_92991v00_machine_learning_section1_ebook.pdf, on or before Oct. 2017, 12 pages.
"Java Enum—Enum in Java", retrieved from https://www.journaldev.com/716/java-enum on or before Oct. 2017, 15 pages.
"Java Package" retrieved from https://en.wikipedia.org/wiki/Java_package on or before Oct. 2017, 5 pages.
Khan, S., "What is a training data set & test data set in machine learning? What are the rules for selecting them?", retrieved from https://www.quora.com/What-is-a-training-data-set-test-data-set-in-machine-learning-What-are-the-rules-for-selecting-them on or before Oct. 2017, 5 pages.
Long, F., et al., "Automatic Patch Generation by Learning Correct Code", retrieved from http://people.csail.mit.edu/fanl/papers/prophet-pop116.pdf on or before Oct. 2017, 15 pages.
Mesquita, D., "Big Picture Machine Learning: Classifying Text with Neural Networks and TensorFlow", retrieved from https://medium.freecodecamp.org/big-picture-machine-learning-classifying-text-with-neural-networks-and-tensorflow-d94036ac2274 on or before Oct. 2017, 21 pages.
"SAP Note Transport-Based Correction Instructions", retrieved from https://wiki.scn.sap.com/wiki/download/attachments/446727546/TCI_for_Customer.pdf?version=1&modificationDate=1465826975049&api=v2 on or before Oct. 2017, 12 pages.
"SAP Solution Manager—Change Request Management" retrieved from https://www.slideshare.net/wlacaze/sap-solman-charm-urgentcorrection-v2 on or before Oct. 2017, 18 pages.
Song, J., "Corrections were not Implemented with [Completely Implemented] status", retrieved from https://wiki.scn.sap.com/wiki/display/SL/Corrections+were+not+implemented+with+%5BCompletely+Implemented%5D+status on or before Oct. 2017, 12 pages.
"Structured prediction" retrieved from https://en.wikipedia.org/wiki/Structured_prediction on or before Oct. 2017, 3 pages.
"Supervised learning" retrieved from https://en.wikipedia.org/wiki/Supervised_learning on or before Oct. 2017, 9 pages.
"Technical Details on Correction Instructions", retrieved from https://help.sap.com/saphelp_nwpi71/helpdata/en/1c/2cee3957f7cd55e10000000a114084/frameset.htm on or before Oct. 2017, 4 pages.

* cited by examiner

CORRECTION OF CODE ERRORS USING MACHINE LEARNING

FIELD

The present disclosure generally relates to automated or semi-automated correction of software coding errors, or bugs. Particular implementations relate to the training or use of a machine learning-based classifier.

BACKGROUND

Determining and correcting the source of software errors or performance issues, commonly referred to as debugging, remains a major problem in software development. Several studies have estimated that debugging consumes over fifty percent of software development time and costs. Although software configuration management systems and formalized debugging approaches can assist in debugging efforts, debugging can remain a tedious, time consuming task.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for detecting and correcting errors in software, such as in source code, using machine learning techniques. A machine learning algorithm can be trained using source code, source code corrections, and extracted code features to provide a trained classifier. Test data, such as code to be scanned for errors or code known to have an error, can be submitted to the trained classifier. The classifier can generate a code correction or corrected code. Code corrections can be applied to the source code to provide corrected code.

A method is provided for obtaining classification results, such as in the form of corrected code or a code correction (such as a correction instruction) using a trained classifier. Test code is received that includes source program code and metadata. One or more features are extracted from the metadata. Test data is provided to a machine learning component. The test data includes source program code and one or more extracted features. A classification result for the test data is received. The classification result is used to provide corrected code (such by replacing erroneous code with corrected code or applying a code correction, such as in the form of a correction instruction, to provide the corrected code).

According to another embodiment, a method is provided for training a classifier based on a machine learning algorithm. A plurality of source code segments are received. The plurality of source code segments are associated with coding errors (e.g., one or more bugs). A plurality of source code corrections to the plurality of source code segments are received. The source code corrections can be correction instructions. A plurality of code features are received for the plurality of source code segments. A plurality of training data objects are generated, where a training data object includes a code segment and its corresponding code correction and a set of features of the plurality of code features. A machine learning algorithm is trained with the plurality of training data objects to provide a trained classifier.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
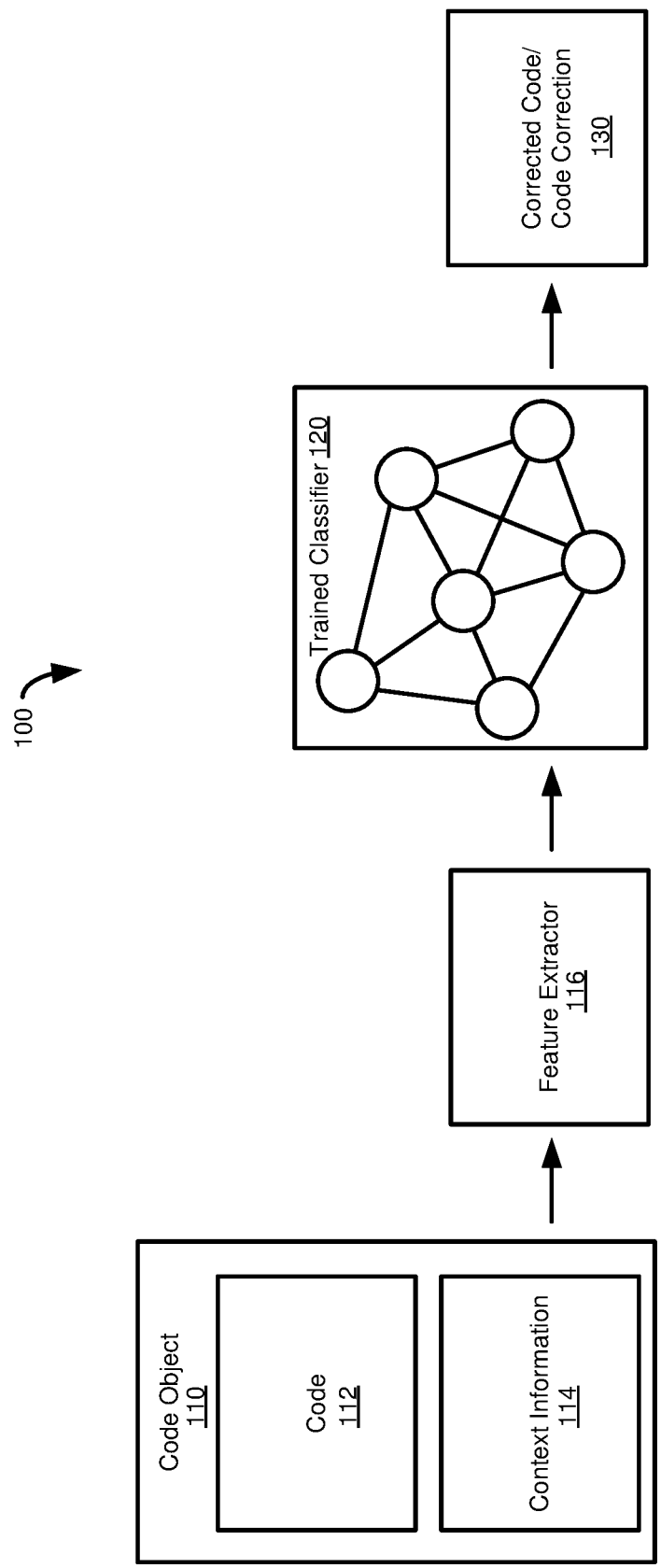
FIG. 1 is a schematic diagram illustrating how a trained classifier can generate corrected code from a code object.

Software is ubiquitous in today's society. Software is being incorporated into an increasing number of devices, developed and improved for an ever increasing number of applications, and is growing ever more complex. Determining and correcting the source of software errors or performance issues, commonly referred to as debugging, remains a major problem in software development. Several studies have estimated that debugging consumes over fifty percent of software development time and costs.

As used herein, a bug, also referred to as a coding error or software defect or fault, refers to code behavior that produces unintended or undesirable behavior. Bugs can result from failure to follow the correct syntax of a programming language. Bugs can also result from improper code semantics or code design, such as mathematical operator errors (e.g., division by zero), variables that may go out of bounds (e.g., a variable that causes an array to go out of bounds), memory leaks, security flaws, or bugs that result from improper interaction of software modules or components. Categories of bugs can include arithmetic errors, logic errors, syntax errors, resource errors, threading errors, interface errors, or errors resulting from the interaction of different programmers. Bugs can be associated with these and other types, and in some cases error messages or codes, including error messages from exception handling routines. As will be described, error types, error messages, and error codes can be used as features to train a machine learning-based classifier, and in test data to be analyzed by such a classifier.

Even after software is released, bugs can be identified, typically requiring software developers to determine the source of an error and deploy an appropriate correction. This problem can be compounded when a user, such as a business, requests customization to a standard software program, or customizes the software themselves.

Software development can be very specialized. As developers work on a particular software program, they may be able to more efficiently determine the source of a software bug and to develop and deploy a correction. However, if the developer leaves or is reassigned, the knowledge can be lost, which can result in work being redone to fix a bug that previously occurred, or more time and resources being needed to fix a new error.

In some cases, software can be updated by adding a file to, or deleting files from, an existing installation. When the files have the same name or identifier between software versions, the old file can be overwritten with the new file version. For instance, in JAVA, if an error is discovered in a class file, the error may be corrected, in at least in some cases, by replacing that class file with a class file that includes corrected code. Object oriented programming concepts can be used to limit the impact of a code change to one component on other components.

In other cases, software can be updated by modifying the contents of an existing file. For example, lines of code in a file can be removed, modified, added, or otherwise changed in (such as being moved within) the file.

In some cases, software may have a primary version, such as a version in which the software was originally released, or a version representing a significant update to the software. Between versions, smaller updates, or code changes, may be made to a software version, such as to correct errors, add features, or improve performance. The terms "code changes" and "updates" are generally used interchangeably in the present disclosure, unless the context or disclosure indicates otherwise. An "update" generally refers to the incremental improvement of a program through code changes.

However, the present disclosure is not limited to code changes that represent updates. For example, a user may wish to determine whether code changes can be implemented to remove features or reduce performance, such as if the program is desired to be executed on a system having fewer resources than recommended for a current code version. Thus, code changes, including updates, need not necessarily represent "upgrades" to a program. In at least some cases, code changes or updates represent a collection of one or more individual code changes that are intended to be applied together, such as in an update package.

The present disclosure relates to improved processes for determining and correcting errors in computer code. Disclosed technologies relate to using machine learning techniques to analyze code and automatically generate corrected code for any errors that may be present in the code. In particular, disclosed technologies can use supervised approaches where prior code fixes are used to train a classifier. Results of using the trained classifier can be used as training data to further improve the performance of the classifier.

In at least some cases, an organization may have a large amount of historical correction data that can be used to train a classifier. For instance, a significant portion of software available from SAP, SE, of Walldorf, Germany, is written in the ABAP programming language. Particularly as it is at least partially an interpreted language, ABAP code can be updated by applying correction instructions to source code, rather than replacing entire source code files or replacing object or executable code files. For instance, updates, such as in the form of correction instructions, can be created and manipulated using the ABAP WORKBENCH of SAP SE and propagated and applied using the SAP HANA TRANSPORT FOR ABAP system, also of SAP SE.

Certain disclosed technologies relate to the inventive realization that correction instructions can provide excellent training data for a classifier using a machine learning algorithm, as correction instructions (for ABAP) typically include information about the original code and the modified code, and include metadata that can be used as additional features for the classifier. However, disclosed technologies are not limited to ABAP code. For instance, code changes in other languages, such as JAVA or C++, can be converted to a format that is at least analogous to an ABAP correction instruction. In further cases, the classifier may have training data that is not in the form of a correction instruction.

The trained classifier can provide output that is in the form of corrected code or instructions that can be used to provide corrected code. When the classifier is trained using correction instructions, the output can be a correction instruction. The output can be applied as provided. Or, the output can be tested. If the output does not correct an error, or produces another error, the output can be used as additional training data for the classifier. Classifier output that contains an error can be manually corrected, or can be resubmitted to a retrained classifier.

The input to the classifier can be code that includes a bug and can also include metadata associated with the code, such as metadata relating to a software program the code is part of, and more granular detailed information about the location or role of the code in the program (e.g., a particular module, abstract data type, or function). As described above, the output can be predicted corrected code or a code correction. The input to the classifier can be code with new functionality, or otherwise changed code. The output can be predicted corrected code or a code correction. That is, the classifier can be used to scan new or changed code for potential bugs, and automatically generate corrected code or a code correction.

Thus, disclosed technologies can provide advantages in identifying and correcting software errors, which can reduce manual effort needed to both find and correct software errors. The disclosed technologies can improve the operation of a computer by providing more secure and better performing code. Disclosed technologies can address the technical problem of software errors through the technical solution of a trained classifier that can be used to provide predicted corrective code. Technical solutions also include a feature extractor that prepares data to be sent to the classifier for training purposes or for classification, and a data formatter that can prepare a correction instruction from a source (e.g., containing a bug) file or other code source and a target (e.g., code with the bug corrected) file or other code source.

Example 2—Example Use of Trained Classifier

FIG. 1 is a block diagram illustrating a scenario 100 of how disclosed technologies can use a trained classifier 120 to generate corrected code 130 for a code object (or segment) 110. The code object 110 can include code 112 and code context information 114. The code 112 can be code where a bug is known or thought to be present, or code to be analyzed to determine whether a bug may be present. That is, the scenario 100 can relate to generating a correction to a bug that is known to exist or to determine whether a bug may exist, such as before deploying code into a production environment.

The context information 114 can be information describing the programmatic environment of the code 112 and other parameters of the code. In some cases, the context information 114 can be metadata that is associated with the code. At least some of the context information 114 can be extracted by a feature extractor 116 as part of formatting the code object 110 as input to be classified by the classifier 120.

The context information 114 is typically selected to be information that may be predictive as to where a bug may occur, or how it may be corrected. For instance, if the context information 114 indicated a particular software component of a larger software program, or a particular file or object (e.g., a file for an abstract data type or another collection of code representing an abstract data type), that may be informative as to what bug may exist and how it may be corrected, if the bug is unique to functionality of that component, file, or object.

In some cases, the more granular the information that is available regarding the possible location of the bug, the better the chance the corrected code 130 will accurately correct a bug, if any, in the code 112. In other cases, an error may not relate to specific functionality of the code 112, but other information, such as context information 114 regarding the nature of a bug (if known, or a particular bug to be searched for) may affect the accuracy of the corrected code 130. For instance, different training data may be relevant depending on whether an error is a failure to handle an exception, a mathematical operator error (e.g., division by zero), or a variable being out of bounds.

For a given implementation, features to be extracted by the feature extractor 116 can be manually determined, including being adjusted (e.g., added, removed, or weighted) in order to achieve desired performance of the classifier 120. In addition to, or in place of, this manual selection, automatic feature selection techniques can be used to determine improved combinations of features, and weightings, to improve performance of the classifier 120. Examples of techniques for feature selection include filter methods (e.g., Chi squared tests, correlation coefficients), wrapper methods (e.g., recursive feature elimination), and embedded methods (e.g., elastic net, ridge regression). Generally, as larger numbers of features are used, the performance of the classifier can degrade due to the "curse of dimensionality." Dimensionality reduction techniques can be used to help address such issues, but feature selection can also affect bias and variance in the results of the trained classifier 120.

The classifier 120 can use any suitable machine learning technique. Generally, the machine learning technique is a supervised machine learning technique, such as decision trees, artificial neural networks, instance-based learning, Bayesian methods, reinforcement learning, inductive logic programming, genetic algorithms, support vector machines, or combinations thereof.

Example 3—Example Classifier Training

Figure 2:
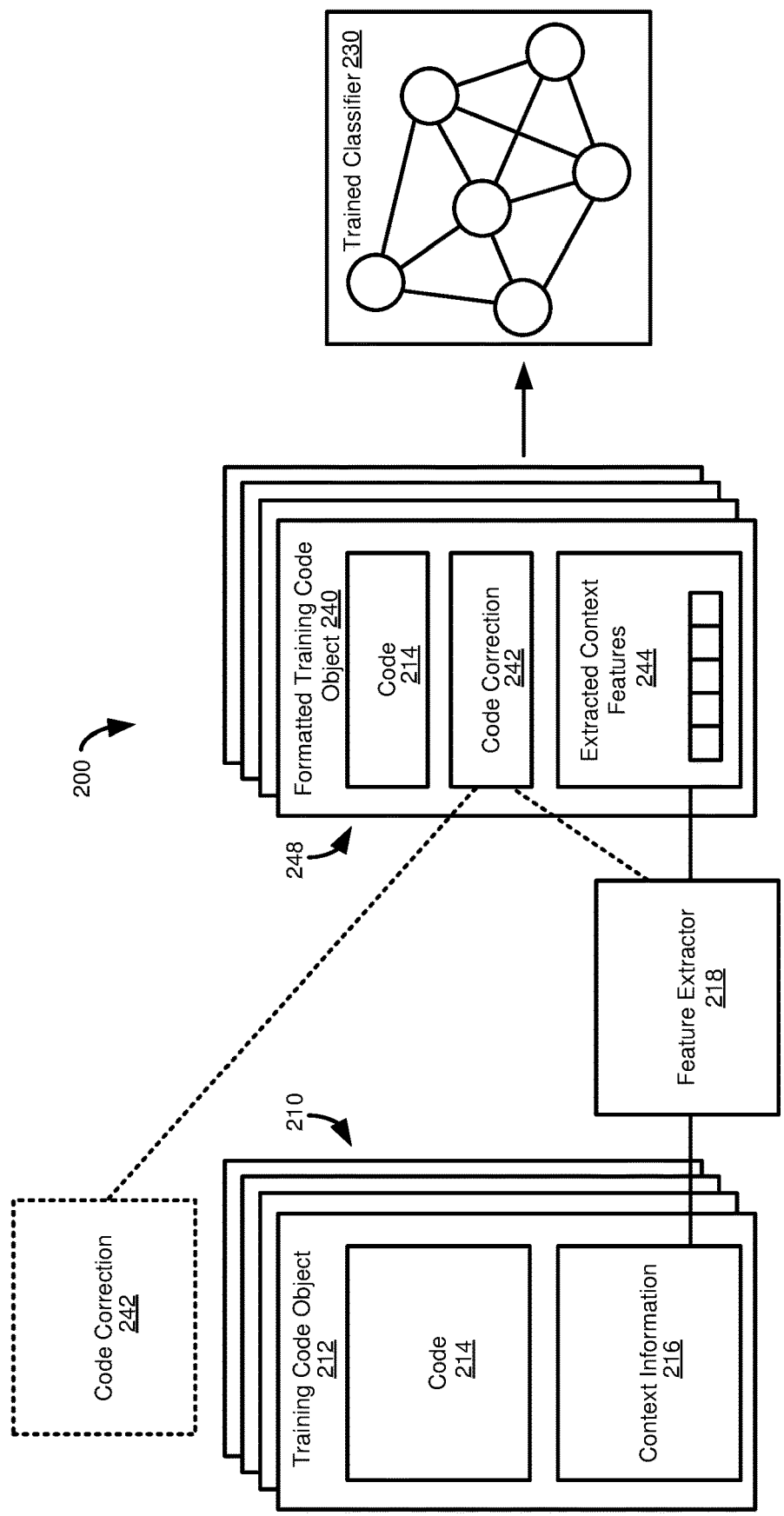
FIG. 2 is a schematic diagram illustrating how a machine learning algorithm can be trained using formatted training code objects to provide a trained classifier.

FIG. 2 illustrates a scenario 200 where a trained classifier 230 (which can be, for example, the trained classifier 120 of FIG. 1) can be produced from a set 210 of training code objects 212. The training code objects 212 can include code 214 and context information 216. As the code 214 is code where a bug was known to have occurred, and was corrected, the code includes the code portion where the bug was located. The code 214 can include additional code.

The amount of additional code to include in the code 214 can relate, in some cases, to the granularity at which features in the context information 216 are tracked. In at least some cases, the code 214 includes the code at the least granular level at which context information 216 may be available. That is, if context information 216 is available to tie the code 214 to a particular function, the code for the function (including the code with the bug) is included. If the context information 216 is available to tie the code 214 to a particular abstract data type, but not to a more granular level, the code for the abstract data type (including the code with the bug) can be included.

In at least some cases, the code 214 can include additional code at a less granular level than the most granular level of the context information 216. For instance, even if the context information 216 can tie code with a bug to a particular function, the code 214 can include the entire code for an abstract data type in which the function is located.

The context information 216 can be information describing the programmatic environment of the code 214 and other parameters of the code. In some cases, the context information 214 can be metadata that is associated with the code. At least some of the context information 216 can be extracted by a feature extractor 218 as part of formatting the training code object 210 as input to train the classifier 230. The context information 216 is typically selected to be information that may be predictive as to where a bug may occur, or how it may be corrected, and can be selected and modified at least analogously as described for the context information 114 and the feature extractor 116 of FIG. 1.

The context information 216, the training code object 212, or another source can supply a code correction 242 of a formatted training code object 240. The formatted training code object 240 can include the code 214 and extracted context features 244 provided by the feature extractor 218 (and optionally other sources). The code correction 242 includes at least portions of the code 214 that were added, removed, or modified to correct the bug, but can include additional code, at least in some implementations. The code correction 242 can include instructions on how to correct the code 214 to fix the bug, in place of, or in addition to, actual code.

Typically, the code correction 242 is input in a way such that the output of the classifier 230 will be provided in the appropriate format. For instance, if an entire file or corrected code segment is the desired output of the classifier 230, the code correction 242 can be an entire file or corrected code segment with the corrected code and any additional code. In some cases, the code correction 242 can be a correction instruction that specifies operations to correct code having the bug. A set 248 of formatted training code objects 240 can be used as input to the classifier 230 to provide a trained classifier.

Example 4—Example Correction Instructions

As has been described, input used to train a classifier, using a machine learning technique, as well as output from the classifier, can be in the form of a correction instruction. A correction instruction can specify operations to modify existing code to correct a bug (or otherwise alter the original code). In at least some cases, the correction instruction can specify at least some code, as well as operations to apply such code to the code to be updated. Correction instructions can also be applied in reverse, such as to produce original, uncorrected code from corrected code.

Figure 3:
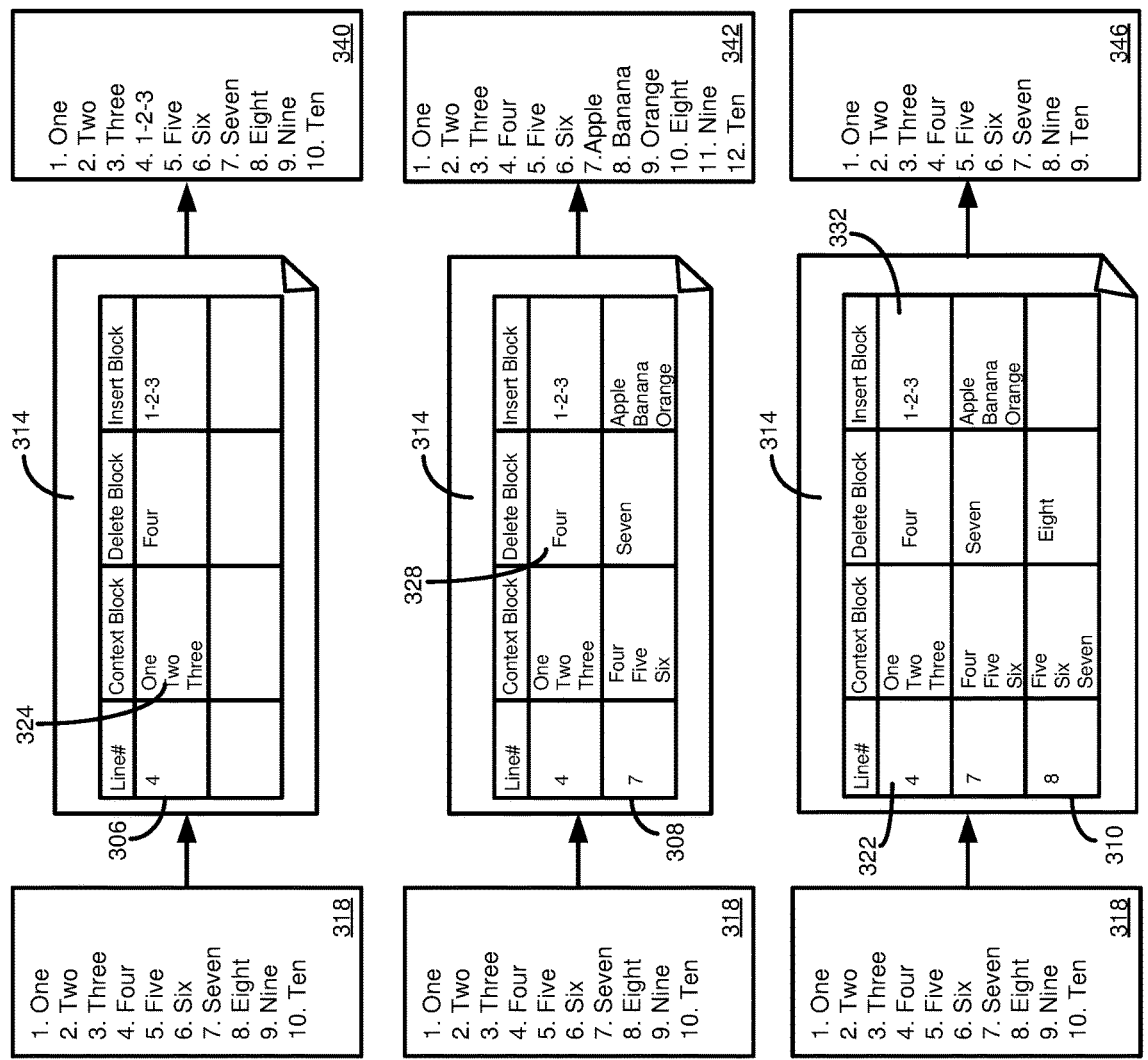
FIG. 3 is a diagram schematically depicting how code changes can be executed using correction instructions having context, delete, and insert blocks.

FIG. 3 schematically illustrates the effects of applying individual update instructions 306, 308, 310 of an update 314 to a base software version 318. The base software version 318 includes ten lines of code, holding, respectively, elements one through ten. Update 314 is organized into a reference line of code 322, a context block 324, a delete block 328, and an insert block 332. Reference line of code 322 identifies a particular line of code that is to be modified. Context block 324 contains lookup information, or elements, that can be used to determine whether the reference line of code 322 is the present in the correct context for the update 314 to be applied. That is, while all versions of a particular piece of software may have a line 20, the content of the surrounding lines of code may differ between the versions. Although three lookup elements are shown in FIG. 3, in practice, more or fewer lookup elements may be used. In addition, in some cases a correction instruction does not include a line number 306. That is the, context block 324 can be used to identify where/if a particular operation of the update 314 should be applied.

Delete block 328 can include code to be deleted from an earlier code version. Insert block 332 can include code to be added to an earlier code version. In some cases, code can be both added and deleted. In other cases, code can be either added or deleted. In other examples, the update process can be carried out in a different manner. For example, update instructions could include changes to be made to one or more lines of code, without deleting the reference lines or adding new code lines.

This Example 4 describes context, delete, and insert blocks 324, 328, 332 in terms of simple words and numbers for simplicity of presentation. However, it should be appreciated that in practice, the changes can include portions of code, such as source code. For instance, an example context block 324 can be:

```
ELSEIF (NOT (ls_sos_list-ctr_hdf_guid IS INITIAL) AND
    NOT (ls_sos_list-ctr_item_guid IS INITIAL)).
    cs_item-ctr_hdr_guid=ls_sos_list-ctr_hdr_guid.
    cs_item-ctr_guid=ls_sos_list-ctr_item_guid.
```

An example delete block 328 can be:

```
IF NOT ls_sos_list-product IS INITIAL. "in case it's not a product
category contract. We clear the price.
CLEAR: cs_item-gross_price, cs_item-price.
ENDIF.
```

An example insert block 332 can be:

```
*no need for this code because the pricing engine takes care of
determining the price.
* IF NOT ls_sos_list-product IS INITIAL. "in case it's not a product
category contract. We clear the price.
* CLEAR: cs_item-gross_price, cs_item-price.
* ENDIF.
```

So, in operation, if the relevant context block 324 is identified, the code in the delete block 328 is replaced with the code in the insert block 332, which, in the example above, comments out the deleted code, in addition to inserting a comment explaining why the code was commented out.

Update instruction 306 references line 4, and the context is identified by the lookups one, two, and three. If the context block is present, the instruction indicates that element four should be deleted, and element 1-2-3 added. Applying update instruction 306 to base software version 318, provides a first updated software version 340. In line 4 of the first updated software version 340, element four has been deleted, and 1-2-3 inserted in its place.

Update instruction 308 references line 7, and the context is indicated by lookup elements four, five, and six. If the context block 324 is present in the base software version 318, the instruction 308 indicates that element seven should be deleted, and the separate elements, Apple, Banana, Orange added. Applying update instruction 308 to base software version 318 provides a second updated software version 342. Element seven of line 7 has been replaced by Apple. The additional elements Banana and Orange have been inserted as new lines in the code, shifting the following code lines down by two.

Update instruction 310 references line 8, and the context is indicated by lookup elements five, six, and seven. If the context block 324 is present, line 8 of the code is to be deleted, with nothing being inserted in its place, as indicated by the empty insert block 332. Applying update instruction 310 to base software version 318 provides a third updated software version 346. Line 8 of the code, having element eight, has been removed, shifting the remaining lines of code up by one.

Figure 4:
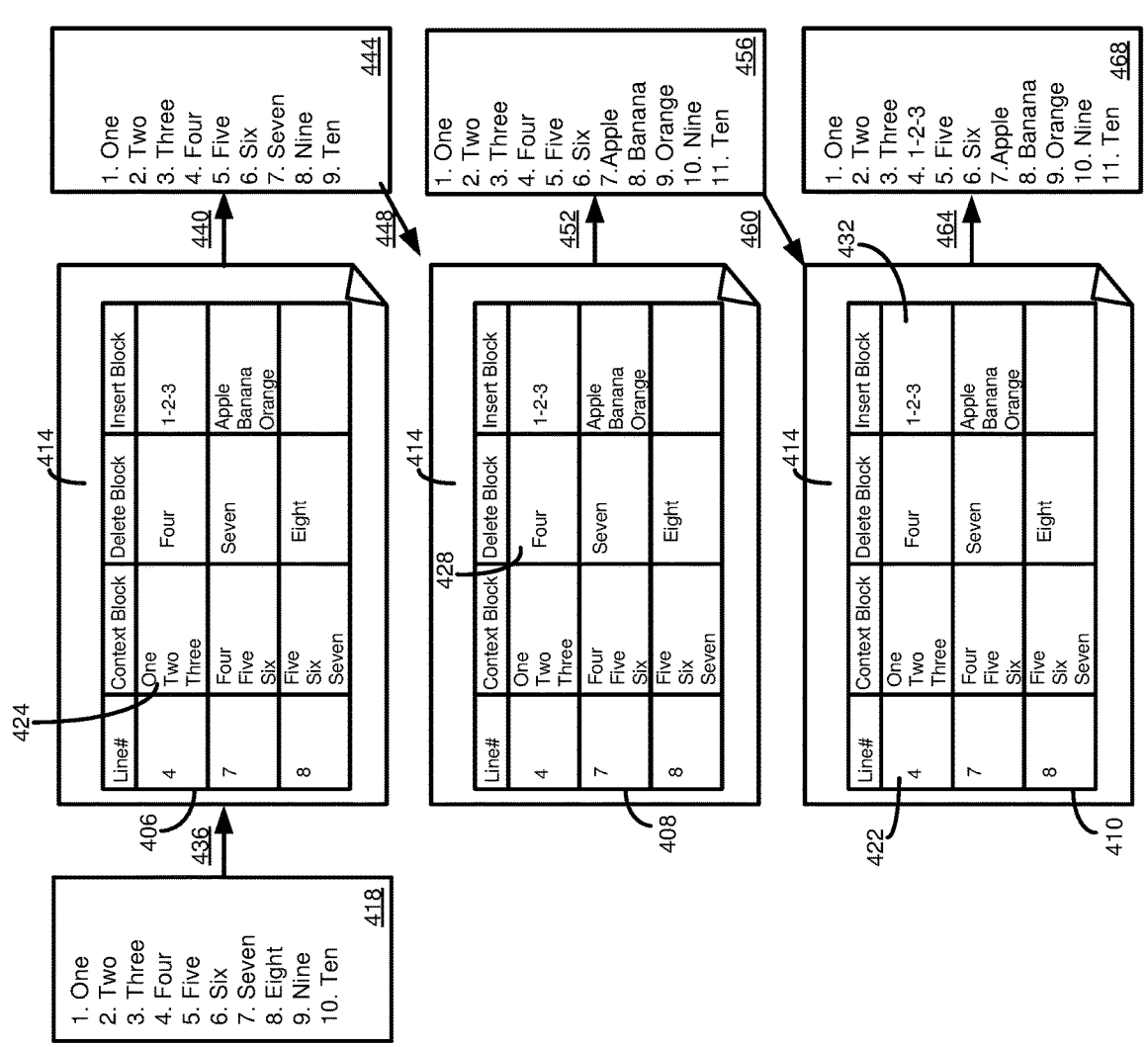
FIG. 4 is a diagram schematically depicting how code changes can be sequentially executed using correction instructions having context, delete, and insert blocks to produce an updated code version.

While FIG. 3 illustrates the effect of applying individual update instructions to a base software version, FIG. 4 illustrates the effect of sequentially applying update instructions 406, 408, 410 of an update 414 to a base software version 418. As with the update 314 of FIG. 3, the update 414 can (optionally) include a reference line of code 422, a context block 424, a delete block 428, and an insert block 432.

In some cases, the update instructions 406, 408, 410 can be applied in a particular order to ensure that the appropriate end result is achieved. In a specific example, the update instructions 406, 408, 410 can be applied starting with the largest line number, and then applying the update instructions sequentially by decreasing line numbers (or can otherwise be specified in a sequential manner, such as by listing the instructions sequentially in the update 414). In other cases the update instructions 406, 408, 410 can be applied in a different order. Or, all or a portion of the update instructions 406, 408, 410 can be applied concurrently. Although three update instructions 406, 408, 410 are shown, the update 414 can include a larger or smaller number of update instructions.

In process 436, it is determined whether the update instruction 410 for line 8 can be applied to the base software version 418. The requisite lookup elements, five, six, seven, are present in the base software version 418. In process 440, update instruction 410 is applied to the base software version 418 to provide a first updated software version 444. In the first updated software version 444, line 8, formerly with element eight, has been removed, and the remaining lines of code shifted up by one.

In process 448, it is determined whether the update instruction 408 for line 7 can be applied. The requisite lookup elements, four, five, six, are present in the first updated software version 444. In process 452, update instruction 408 is applied to the first updated software version 444 to provide a second updated software version 456. In second updated software version 456, application of the delete block 428 of the update instruction 408 results in removal of line 7, and its former element seven. Application of the insert block 432 of update instruction 408 results in Apple, Banana, and Orange inserted in place of former line 8, resulting in two additional lines of code, shifting the following lines of code down by two.

In process 460, it is determined whether the update instruction 406 for line 4 can be applied to the second updated software version 456. The requisite lookup elements, one, two, three, are present in the second updated software version 456. In process 464, the update instruction 406 is applied to the second updated software version 456 to provide a third updated software version 468. The delete block 428 of update instruction 406 indicates that element four of line 4 should be deleted, and the insert block 432 indicates that 1-2-3 should be added in its place. Thus, the third updated software version 468 represents the complete application of the update 414 to the base software version 418.

Although this Example 4 describes implementing code changes using context, insert, and delete blocks, in further examples two software versions (e.g., an earlier version and a later version where one (or more) updates have been applied to the earlier version) can be compared to generate the contents of the update, such as context, insert, and delete blocks for carrying out changes in the update.

Example 5—Example Code Object

Figure 5:
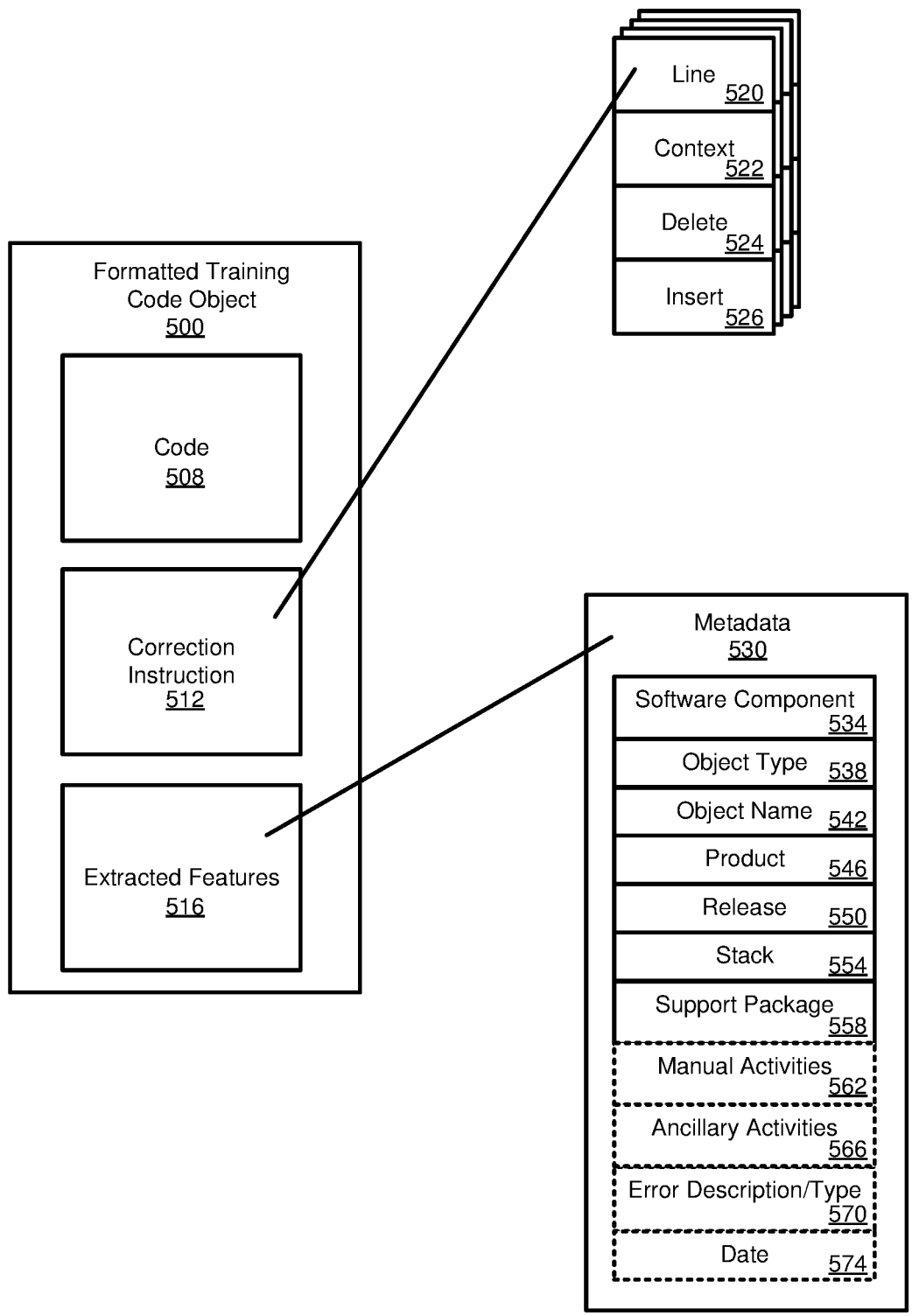
FIG. 5 is a block diagram illustrating components of a formatted training code object.

FIG. 5 presents a schematic diagram of a formatted training code object 500, such as the formatted training code object 240 of FIG. 2. The formatted training code object 500 includes code 508, one or more correction instructions 512, and extracted features 516. The correction instructions 512 can include a code line number 520 at which a change is to be applied. A context block 522 can be used to confirm that the correction instruction 512 should be applied to the particular code being analyzed. The correction instruction 512 can include a delete block 524 for any code to be removed and an insert block 526 for any code to be added. In further aspects, the line numbers 520 are not included in a correction instruction 512, or the correction instruction otherwise includes more, less, or different content than shown.

The correction instructions 512 can be implemented at least generally as described for the update 314 of FIG. 3 and the update 414 of FIG. 4. For instance, if code is to be added, but not removed, code can be specified in the insert block 526, and the delete block 524 can be left blank. If code is to be removed, but not added, the delete block 524 can specify code, and the insert block 526 can be left blank. If code is to be modified, such as to replace one or more lines of code with corrected code, both the delete block 524 and the insert block 526 can be populated.

FIG. 5 also depicts details of extracted features 516. Although described as being extracted, in at least some cases, some or all of the extracted features 516 can be supplied from a source other than metadata (e.g., directly specified in the same file or object) associated with the code 508. For instance, a user can manually supply some or all of the extracted features 516, or some or all of the extracted features can be automatically determined by analyzing the code 508 and its surrounding context (e.g., searching the code for relevant information or related code or its associated information, such as analyzing a package in which a particular class file is located).

Whether associated directly with the code 508 or determined or supplied by another source, the extracted features 516 can serve as metadata 530. The metadata 530 can include information regarding a software component 534 with which the code 508 is associated. The software component 534 can be a particular functional module of a larger software program.

The metadata 530 can include an object type 538. The object type 538 can specify the source or formatting of the code 508, such as if the code is in the form of, or from, a file (or a particular file or format, such as if the file is a XML file or a JSON object), whether the code represents an abstract data type, such as a class, an enumeration, an interface, an annotation, etc., or if the code represents another type of programming object or structure. The metadata 530 can include an object name 542, which can correspond to the name of a file or other programming object (e.g., the name of a class or other abstract data type, such as the name of a particular object type specified by the identifier 538).

The metadata 530 can include a product name or identifier 546, which can be an overall software program or suite that includes the software component 534. For instance, the product name 546 might be a word processing program, and the software component 534 might be a spell checking module. Although shown as including the product name 546 and the software component 534, the metadata 530 can include information about the context of the code 508 at greater or lesser levels of granularity (including, in some cases, including no such context information). As described above, generally, context information is included, and at various granularity levels, to the extent it may be useful in classifying unknown inputs.

The metadata 530 can include additional information about the programmatic context of the code 508, such as a release identifier 550, which can indicate a version of the object associated with the object name 542, with the software component 534, or with the product 546. The metadata 530 can indicate a stack 554, or programming language in which the code 508 is written. The stack identifier 554 can be useful, for example, when different classifiers are available for different programming languages. Typically, it is desirable to use a classifier that has been trained using training code objects 500 that have code 508 in the same programming language as the unknown inputs that are to be classified.

The metadata 530 can include information about updates that may have been applied to the code 508, or related code (e.g., other code of the software component 534 or in the product 546), as indicated in a support package identifier 558. Information about the support package 558 can be useful in classification, as the correction to a bug may be influenced by whether the bug is in the same code version as particular training data, or in a later or earlier version.

In some cases, the formatted training code object 500 can include activities that are to be manually carried out, such as by a user (e.g., an administrator) of a computing system on which the correction instruction 512 is to be (or was) applied. For instance, manual activities may be those that cannot automatically be applied by an update system. The metadata 530 can include a field 562 that includes information regarding any manual activities associated with the correction instruction.

The metadata 530 (or, in some cases the correction instruction 512) can optionally include one or more ancillary activities 566. Ancillary activities 566 can be changes to be made to fully or partially correct a bug, other than changes to source code. For instance, ancillary activities can include changing a database table (e.g., changing a value, changing a field, adding or removing a table) or configuration settings (including configuration setting in a database table). In various embodiments, ancillary activities 566 can be manually applied, automatically applied, or a combination thereof.

The metadata 530 can include an error description or type identifier 570. The error description or type identifier 570 can be an error code or other identifier or a category of error (e.g., mathematical operator error, file not found error, exception not handled error, variable out of bounds error, etc.). The metadata 530 can also include a date 574, which can be a date the correction instruction was authored or released.

The metadata 530 can include more, less, or different information than shown. As explained above, metadata 530 can be included, or excluded, to the extent it provides a predictive benefit for a trained classifier. In addition, although the metadata 530 has been described in the context of a formatted training code object 500, the same or similar metadata can be included for formatted test objects (e.g., data that is to be submitted to the trained classifier for classification). In at least some cases, fewer metadata 530 fields may be available for test data than for training data. For instance, for test data (e.g., code that is known to have, or may have, a bug, and for which a code correction is desired), the software component 534, object type 538, object name 542, product 546, release 550, stack 554, and support package 558 are typically known. The error description/type 570 may or may not be known. Typically, the manual activities 562, the ancillary activities 566, or the date 574 may not be known or may be not relevant (e g, manual activities for a correction and a date of a correction would not typically be known until a correction was generated).

Example 6—Example Code Corrections from Source and Corrected Source Code

Figure 6:
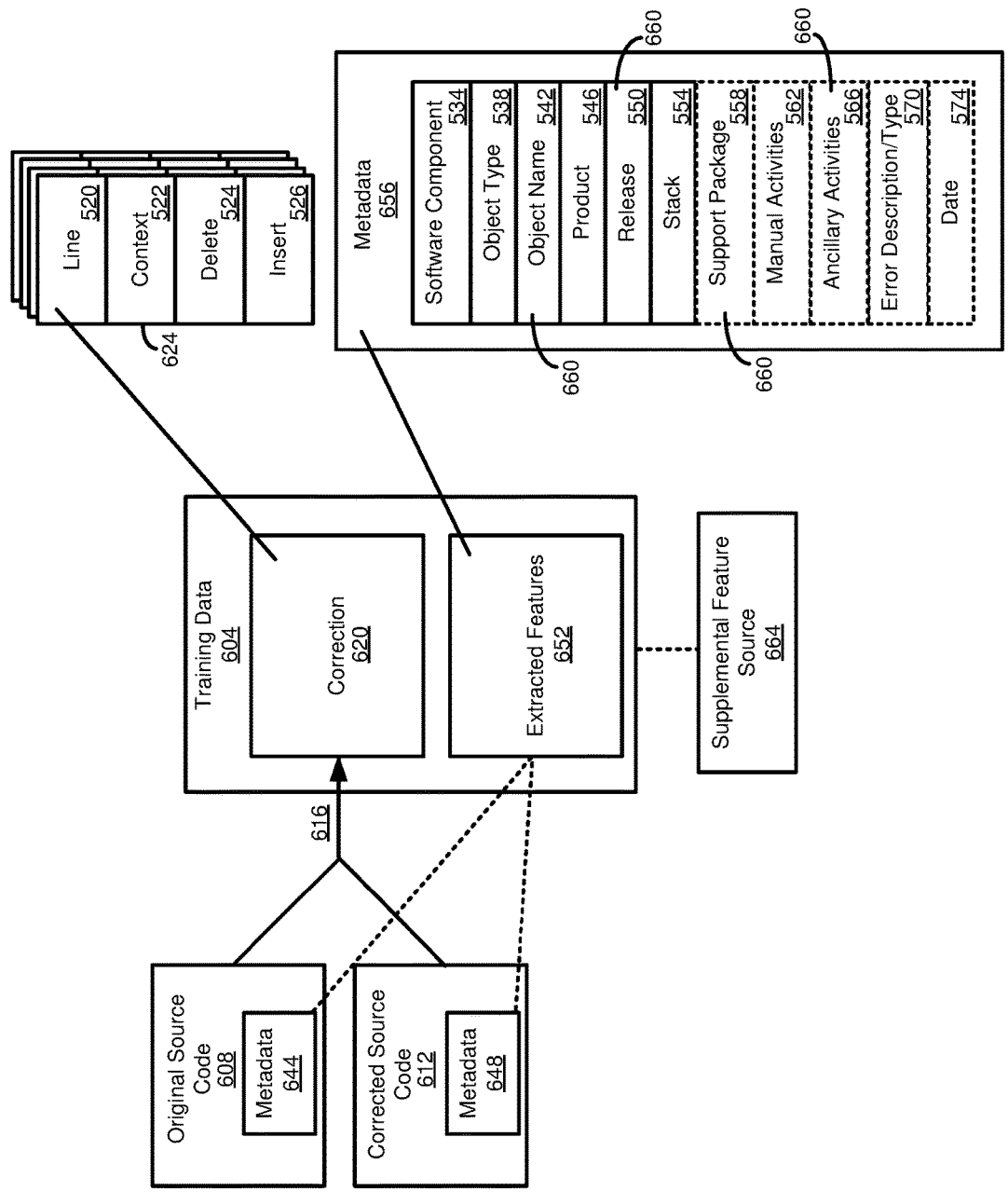
FIG. 6 is a diagram schematically depicting how training data can be generated from source code and corrected source code.

FIG. 6 illustrates how training data 604 can be generated from code where correction instructions, such as the correction instruction 512 of FIG. 5, are not normally used. The scenario of FIG. 6 can be used, for example, to generate correction instructions for code in programming languages such as JAVA, Javascript and C++.

In FIG. 6, original source code 608 and corrected source code 612 are compared in a process 616. The comparison process 616 determines code changes between the original source code 608 and the corrected source code 612. The code changes can be associated with a line number in a code version (e.g., the changes can be relative to the original source code 608 or the corrected source code 612, but are typically specified relative to the original source code). The code changes can be lines of code that have been added to a code version, removed from a code version, or are changed between code versions.

These additions, deletions, and changes can be specified with respect to a code line number (or code context) of the original source code 608 or the corrected source code 612. For instance, if a line of code was added to the original source code 608, the change can be specified as adding (inserting) the line of code to the original source code. This change could instead be specified as removing the line of code from the corrected source code 612, with reference to the line of code that should be removed from the corrected source code 612 (after which the code would be identical to the original source code 608). As described above, in at least some cases, actual code line numbers are not used in at least some implementations of code corrections.

Information regarding added, deleted, and changed lines of code obtained in process 616 can be formatted into a correction 620 included in the training data 604. The correction 620 can be specified as a correction instruction 624, which can have the same structure and function as the correction instruction 512 of FIG. 5. In particular, each change to implement a correction can be expressed as a line number 520 where a change is to be made, a context block 522 to confirm that the code to be changed is the correction version, a delete block 524 specifying code to be removed, and an insert block 526 specifying code to be added.

The original source code 608 can have metadata 644, and the corrected source code 612 can have metadata 648. The metadata 644, the metadata 648, or a combination thereof can provide extracted features 652 of the training data 604. Extracted features 652 can provide metadata 656 of the training data 604, which can be the same or similar to the metadata 530 of FIG. 5.

In some cases particular properties 660 of the metadata 656 can be provided by the original source code 608 and other properties can be provided by the corrected source code 612. In other cases, all of the properties 660 can be supplied by one of the original source code 608 and the corrected source code 612. When both the original source code 608 and the corrected source code 612 include the same property 660, it may be possible that the value of the property may differ between the original source code and the corrected source code. In that event, rules can be specified to determine, in the event of a conflict, if a value for a property should be taken from the original source code 608 or the corrected source code 612.

Extracted features 652, including properties 660 of the metadata 656, can be supplied, in some aspects, by a supplemental feature source 664. The supplemental feature source 664 can be a user. The supplemental feature source 664 can also be an automated process, such as a process that can query a database or other data source for information to be included in the metadata 656, or can apply rules (including user-defined rules) to assign extracted feature information to the training data 604, such as based on metadata 644 of the original source code 608 or metadata 648 of the corrected source code 612.

Example 7—Example Architecture

Figure 7:
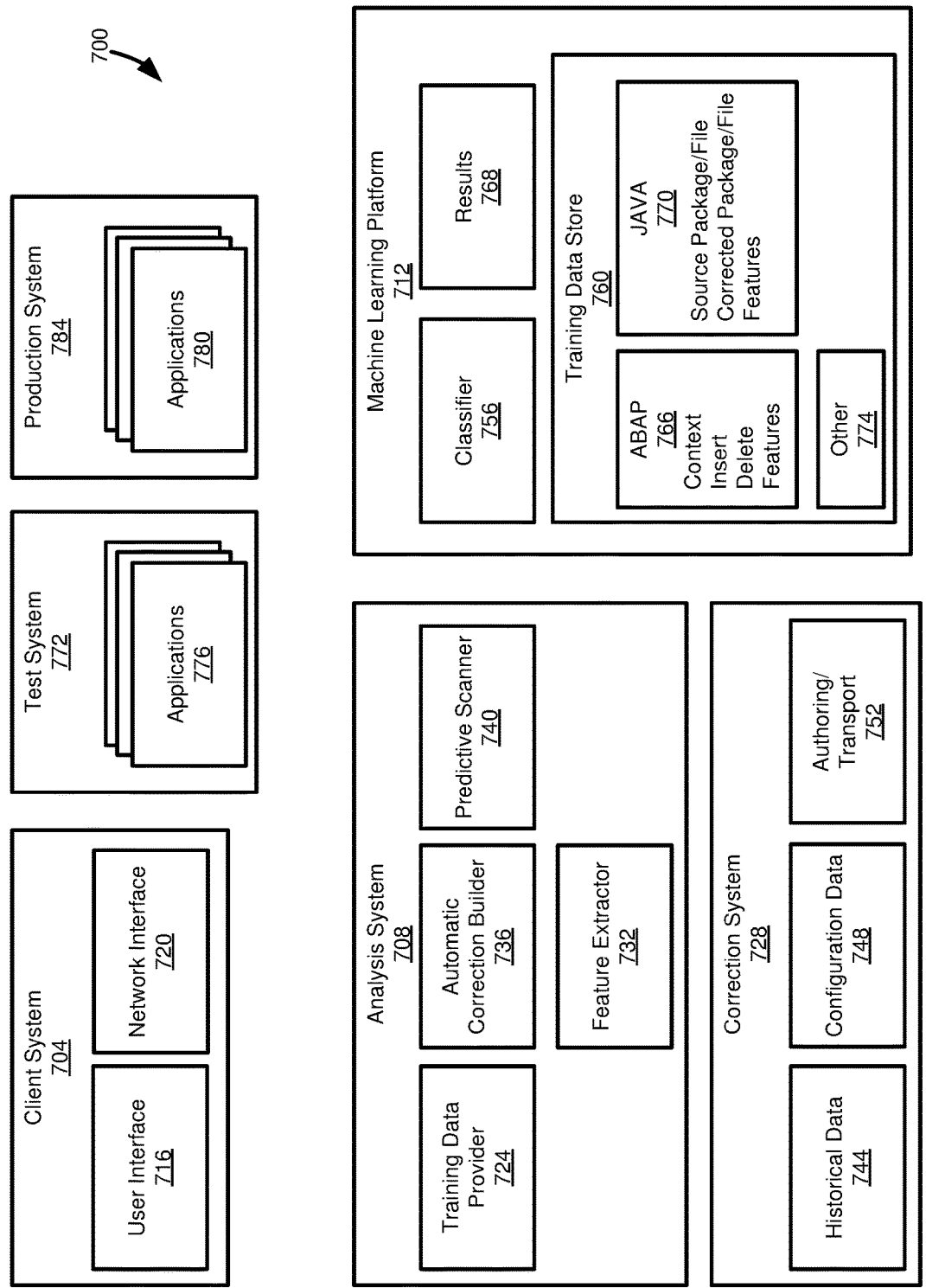
FIG. 7 is a block diagram of an architecture in which disclosed technologies can be implemented.

FIG. 7 illustrates an architecture 700 in which the disclosed technologies can be implemented. The architecture includes a client system 704, an analysis system 708, and a machine learning platform 712. The client system 704 can include a user interface 716, through which a user can take actions using the analysis system 708. The client system 704 can also include a network interface 720, which the client system 704 can use to communicate with other components of the architecture 700.

The analysis system 708 can include a training data provider 724. The training data provider 724 can retrieve, and optionally format, training data to be used with the machine learning platform 712. For instance, the training data provider 724 can retrieve code versions or correction instructions from a correction system 728. The training data provider 724 can call a feature extractor 732. The feature extractor 732 can analyze training data from the training data provider 724 to extract features that can be used by the machine learning platform 712 to train a classifier. For instance, the feature extractor 732 can be used to extract the metadata 530 of FIG. 5.

In some cases, the feature extractor 732 can also supply features (e.g., in the metadata 530) that are not directly present in the training data, including prompting a user to supply such features, applying rules to assign such features, or searching other data sources for the relevant information. In particular aspects, the feature extractor 732 can also extract correction instructions, or elements thereof (e.g., context, delete, and insert blocks), or can generate a code comparison, including formatting the code comparison as a code correction, such as in the format of a correction instruction.

The analysis system 708 can include an automatic correction builder component 736. The automatic correction builder component 736 can provide functionality for receiving code that is (or may be) the source of a bug (e.g., erroneous code) and for generating a code correction to address any bug that may be present. As has been described, the correction can be, in various embodiments, a file or code fragment that can, for instance, overwrite an original file or fragment to correct the error, or can be a correction that is applied to code (e.g., deletion, insertion, or replacement of lines of code) to correct the error. The correction, in particular cases, can be in a format that can fully or partially be automatically applied to code, such as in the form of a correction instruction (e.g., that can be handled by a framework for applying code updates or corrections).

The analysis system 708 can also include a predictive scanner 740. The predictive scanner 740 can analyze code, such as newly written code, to determine if the code includes a bug (including resulting from its interaction with other code components, such as other classes or other abstract datatypes). The predictive code scanner 740, if a bug is identified, can produce code or a code correction to address the bug, in an analogous manner to the automatic correction builder component 736.

The automatic correction builder component 736 and the predictive scanner 740 can access the feature extractor 732, at least in some cases. For instance, the feature extractor 732 can assist in extracting predictive features from test data (e.g., code to be analyzed), and optionally otherwise formatting the test data to be used by the machine learning platform 712. In other cases, all or a portion of the formatting can be carried out by the automatic correction builder component or the predictive scanner 740.

The correction system 728 can include historical data 744. The historical data 744 can include code corrections, such as in the form of correction instructions, and associated metadata. The historical data 744 can also include code versions (e.g., original code releases and updates thereto) from which code corrections can be generated (such as by one or more components of the analysis system 708), and associated metadata.

The correction system 728 can include configuration data 748. The configuration data 748 can include information regarding software components used in the architecture 700, such as identifying applications, and version and update information therefor, used in the client system 704 (or on a test system 772 or a production system 784). The configuration data 748 can be used to provide metadata for training data or test data to be used with the machine learning platform 712.

The correction system 728 can also include an authoring/transport component 752. The authoring/transport component 752 can include functionality to allow code corrections (e.g., in the form of correction instructions) to be created and sent to other components of the architecture 700, such as the client system 704 (or the test system 772 or the production system 784), to be applied to software located thereon. The authoring/transport component 752 can be used, in particular example, to apply code corrections generated by the machine learning platform 712.

The machine learning platform 712 can include one or more classifiers 756. In some cases, a classifier 756 can be included for each type of code (e.g., code in a particular programming language) or type of code correction for which test data is to be classified. For instance, different classifiers 756 can be created for ABAP code and for JAVA code, and even for JAVA code, different classifiers can be used when JAVA corrections are to be applied via correction instructions and in another manner (e.g., via file replacement). Different classifiers 756 can have the same or different machine learning algorithms, and, at least in some cases, the classifiers may be configured to use the same code and code correction format, but have different machine learning techniques. Different classifiers 756 can also use different sets of features, including having classifiers for the same programming language, the same code correction format, and the same machine learning algorithm that are configured to analyze/trained using different feature sets.

The machine learning platform 712 can include a training data store 760 that includes training data for the one or more classifiers 756. As described above, the classifiers 756 may differ in the training data used to produce the classifier (and, correspondingly, data that the classifier is configured to classify), and so the training data store 760 can include different training data for different classifiers. As shown, the training data store 760 includes ABAP training data 766, JAVA training data 770, and other training data 774. In some scenarios, a particular set of training data of the training data store 760 can be used with multiple classifiers 756, such as when classifiers differ in the machine learning algorithm used, but are otherwise similar (e.g., same language, correction format, and features).

The classifiers 756 can produce results 768. Typically, the results 768 are in the form of a code correction (e.g. instructions defining one or more actions or operations to apply to code to provide corrected code) or corrected code. All or a portion of the results 768 can be sent from the machine learning platform 712 to the analysis system 708 or the correction system 728, including to be applied to software in the architecture 700 using the authoring/transport component 752.

In some cases, it may be desirable to test the results 768 before applying the corrected code or code correction to software that is in production (e.g., actual or widespread use, as opposed to use in a development system or a quality control system). Thus, the architecture 700 can include a test system 772 having applications 776, which can be at least generally the same as applications 780 of a production system 784. Results 768 can be tested on the test system 772. If the results 768 perform as expected or desired, they can be deployed to the production system 784, including through the authoring/transport component 752. If the results 768 do not perform as expected, they can be manually revised, submitted to the machine learning platform 712 as additional training data and then the originating test data resubmitted for classification, or the code or code correction fixed in another automated manner to provide desired results. Once the code or code correction has been fixed, it can be deployed to the production system 784.

The test system 772 can also be used to determine any manual or ancillary activities that should be carried out in addition to corrected code or code corrections in the results 768. These manual or ancillary activities can be in addition to any such activities specified in the results 768 (for example, when manual or ancillary activities are part of the classification results specified in training data, as opposed to features of data to be classified).

Although shown as different components, one or more of the client system 704, analysis system 708, machine learning platform 712, test system 772, and production system 784, or a portion of their constituent functionality, can be combined, functionality can be split into further components, or additional functionality added to the components. For instance, the production system 784 can be part of the client system 704. In another scenario, the analysis system 708 can be combined with the machine learning platform 712 and/or the correction system 728.

Example 8—Example Training Data Provider

Figure 8:
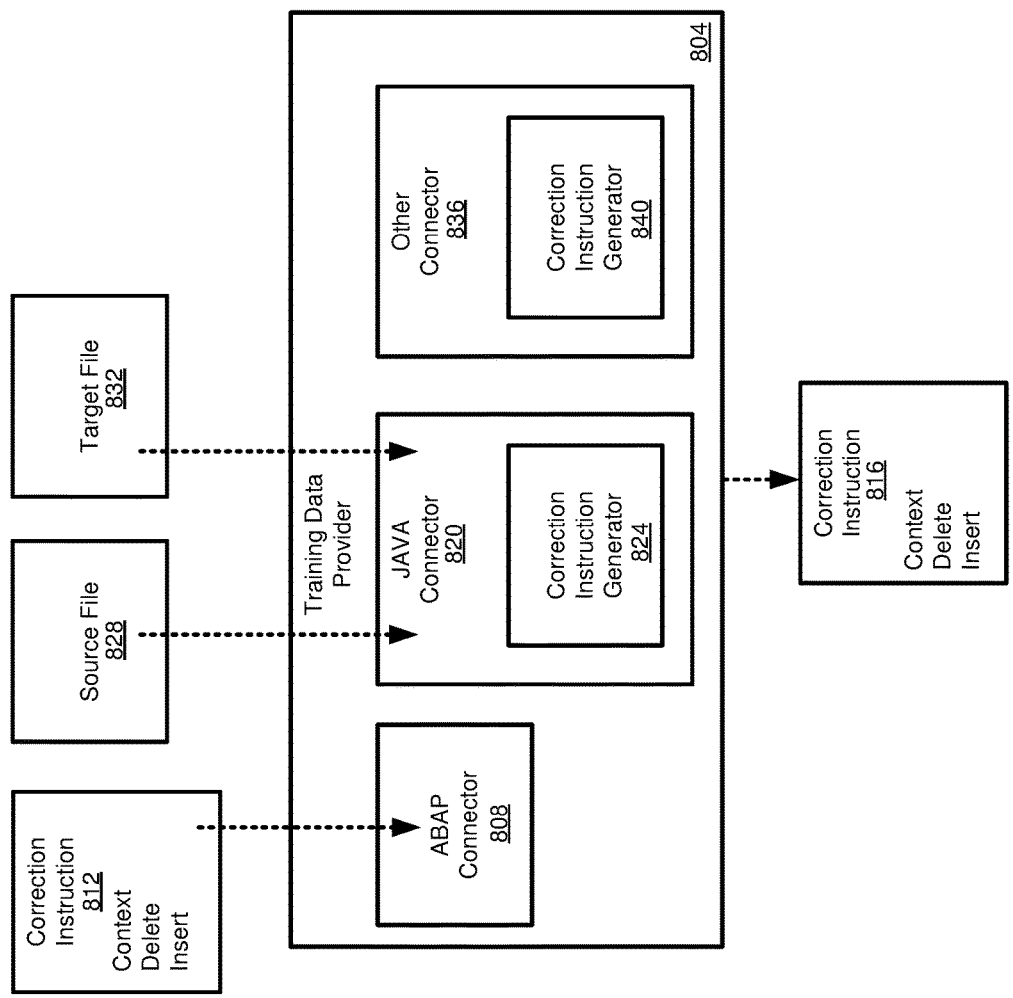
FIG. 8 is a diagram schematically depicting a training data provider and how the training data provider may produce a correction instruction.

FIG. 8 illustrates a particular embodiment 804 of the training data provider 724 of FIG. 7. The training data provider 804 can have components for generating training data for code in different programming languages or code provided in different formats.

The training data provider 804 can include an ABAP connector 808. The ABAP connector 808 can receive correction instructions 812 and provide the training data in the form of a correction instruction 816. In some cases, the ABAP connector 808 can collect and aggregate collection instructions 812 to be used as training data, but does not alter the correction instruction 812. In other cases, the ABAP connector 808 can collect and aggregate correction instructions 812 to be used as training data, but can alter the correction instruction in producing the correction instruction 816, such as by extracting features (e.g., metadata) of the correction instruction 812 or by augmenting the correction instruction, such as adding features (e.g., metadata) present in the correction instruction 816.

The training data provider 804 can include a JAVA connector 820. The JAVA connector 820 can include a correction instruction generator 824. The correction instruction generator 824 can generate the correction instruction 816 from a source file 828 (e.g., original source code containing a bug, which could be in a form other than a file, such as a code excerpt) and a target file 832 (e.g., corrected source code, which could be in a form other than a file, such as a code excerpt). Generating the correction instruction 816 can include identifying lines of code that are different between the source file 828 and the target file 832 and generating suitable deletion and insertion operations to relate the two code versions. Context information can be included to help identify code sites at which a particular insert or delete operation should applied.

The training data provider 804 can included a connector 836 for other programming languages or input sources or formats. For instance, the connector 836 can be for C++ code, and can include a correction instruction generator 840, where the correction instruction generator can operate analogously to the correction instruction generator 824. The connector 836 can be for a different programming language than another connector, or can be for the same programming language and can be configured to accept different input or produce different output. For example, the connector 836 could be a connector for ABAP code provided in the form of source files 828 and target files 832, rather than the correction instructions 812. Or, the connector 836 could be a connector for JAVA code provided in the form of correction instructions 812. Although shown as providing output in the form of the correction instruction 816, the output could be provided in another format, such as another code correction (e.g. specifying operations to provide corrected code) or a list of code differences between the source file 828 and the target file 832.

Example 9—Example Classifier Training with Correction Instructions

Figure 9:
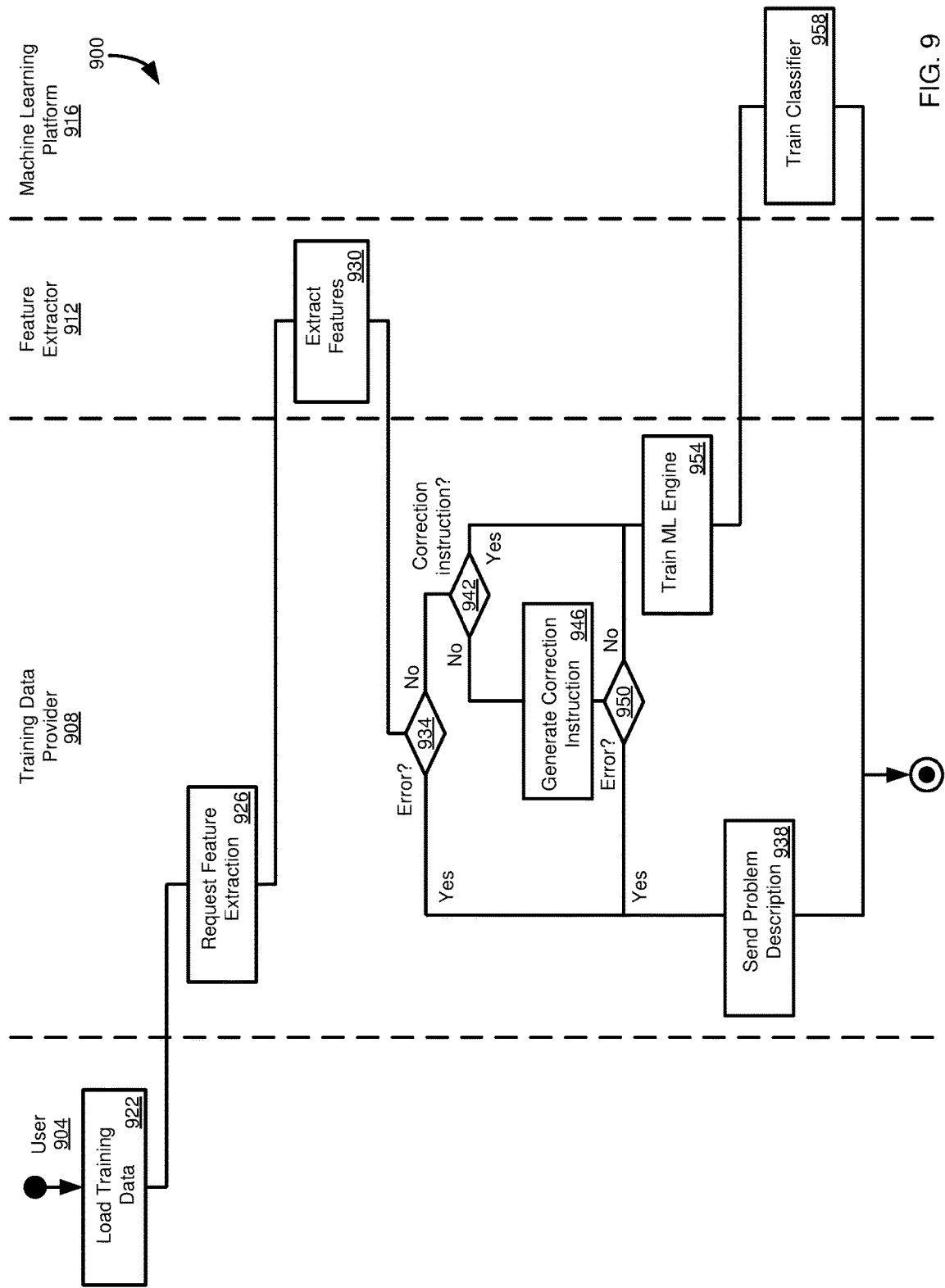
FIG. 9 is a flowchart illustrating operations for training a classifier.

FIG. 9 illustrates a method 900 for training a classifier (e.g., based on a machine learning algorithm). The method 900 includes operations carried out by a user 904, a training data provider 908, a feature extractor 912, and a machine learning platform 916. The training data provider 908, the feature extractor 912, and the machine learning platform 916 can be at least analogous to the correspondingly titled components 724, 732, 712 of FIG. 7.

At 922, the user 904 enters a request to the training data provider 908 to load training data for use in training the classifier. The training data provider 908 locates the relevant data (e.g., correction instructions or source/target code versions) and requests at 926 that the feature extractor 911 extract features from the relevant data. The extracted features can be code corrections (including, for example, elements of a correction instruction, such as context, delete, and insert blocks). The extracted features can be metadata, such as the metadata 530 of FIG. 5.

The feature extractor 912 extracts features from the training data at 930. The extracted features are returned from the feature extractor 912 to the training data provider 908. At 934, the training data provider 908 can determine if any problems were encountered by the feature extractor 912 (e.g., features could not be located, were missing information, or were in an incorrect format). If a problem is detected, the training data provider 908 can generate a problem description (e.g., an exception report or other type of error message). The problem description can be sent, such as to the user 904, at 938.

If it was determined at 934 that no problems were encountered by the feature extractor 912, the training data provider 908 can determine at 942 whether the training data is in the form of a correction instruction or some other form. If the training data is not in the form of a correction instruction, a correction instruction can be generated at 946. At 950, the training data provider 908 can determine if any errors were encountered during the attempt to generate the correction instruction at 946. An error may occur, for example, if two code versions are too dissimilar, are written in different programming languages, or if a code version (e.g., source or corrected) cannot be located. If a problem was encountered, the operations 900 can generate a problem description and send the problem description at 938.

If the training data provider 908 determines at 950 that no problem occurred in generating the correction instruction at 946, or determines at 942 that the training data is in the form of a correction instruction, the training data provider can send a request at 954 to train a machine learning engine (e.g. a classifier on the machine learning platform 916). The request can include the training data. The machine learning platform 916 trains a classifier with the training data at 958. After the classifier is trained at 958, or the problem description sent at 938, the operations 900 can end.

Example 10—Example Classifier Generation of Correction Instructions

Figure 10:
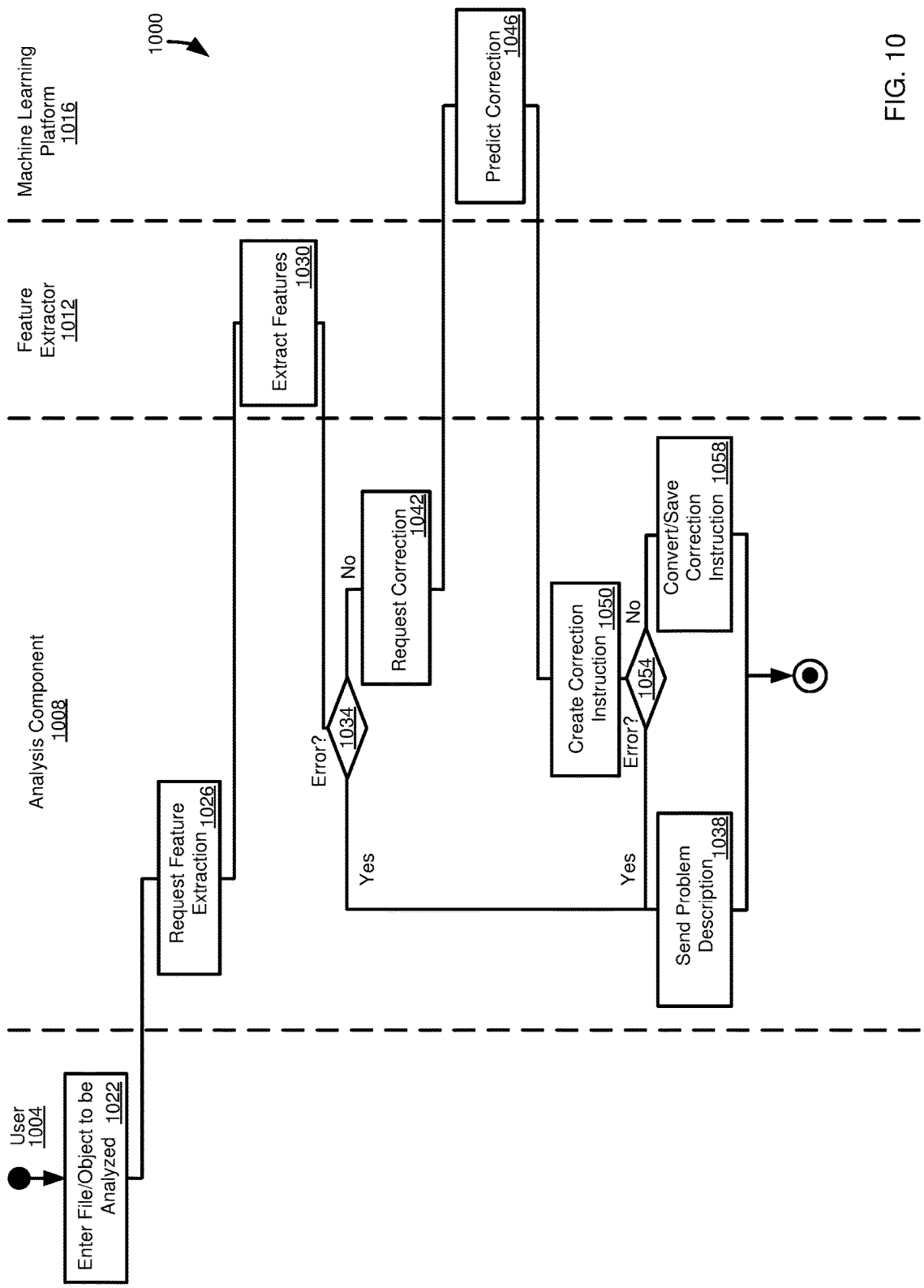
FIG. 10 is a flowchart illustrating operations in classifying test data.

FIG. 10 illustrates a method 1000 for classifying (e.g., using a classifier based on a machine learning algorithm) test data, such as code known to have a bug or code to be scanned for a bug, such as newly written code prior to deployment of the code. The method 1000 includes operations carried out by a user 1004, an analysis component 1008, a feature extractor 1012, and a machine learning platform 1016. The feature extractor 1012 and the machine learning platform 1016 can be at least analogous to the correspondingly titled components 732, 712 of FIG. 7. The analysis component 1008 can be the automatic correction builder 736 or the predictive scanner 740, depending on whether a file or object to be analyzed includes code known to have a bug (and for which corrected code or a code correction is desired) or code to be scanned for bugs (and for which corrected code or a code correction is desired).

At 1022, the user 1004 enters (or provides) a file or object to be analyzed. The file or object to be analyzed includes code, and typically includes, or at least can be associated with, metadata, such as a particular product or application that includes the code, version information, a description of a bug (if the code is known to have a bug, or a type of bug to search for, for code to be predicatively analyzed). The file or object is provided by the user 1004 to the analysis component 1008. The analysis component 1008 requests at 1026 that the feature extractor 1012 extract features from the file or object (e.g. metadata included with the file or object, or which can be otherwise be determined for the file/object). The extracted features can be metadata, such as the metadata 530 of FIG. 5.

The feature extractor 1012 extracts features from the test data at 1030. The extracted features are returned from the feature extractor 1012 to the analysis component 1008. At 1034, the analysis component 1008 can determine if any problems were encountered by the feature extractor 1012 (e.g., features could not be located, were missing information, or were in an incorrect format). If a problem is detected, the analysis component 1008 can generate a problem description (e.g., an exception report or other type of error message). The problem description can be sent, such as to the user 1004, at 1038.

If it was determined at 1034 that no problems were encountered by the feature extractor 1012, the analysis component 1008, at 1042, can generate and send a correction request to the machine learning platform 1016 to provide a correction prediction, if the file or object is known to include a bug or is determined by the machine learning platform to contain a bug. The machine learning platform 1016 applies a classifier (or, in some cases, a plurality of classifiers, including combining results from multiple classifiers) at 1046 to determine a predicted correction or corrected code, or an indication that the code does not contain a bug (or, the indication that the code does not contain a bug can be that the predicted result is the same code that was submitted for classification—no changes to the code were determined to be needed).

The predicted correction or corrected code is sent from the machine learning platform 1016 to the analysis component 1008. The analysis component 1088 creates a correction instruction at 1050. Generating a correction instruction at 1050 can include formatting corrective code as a correction instruction or preparing a correction instruction for deployment.

It is determined at 1054 whether the analysis component 1008 encountered an error while generating a correction instruction at 1050. If the analysis component 1008 encounters an error while trying to generate the correction instruction at 1050, the analysis component can generate a problem description and send the problem description at 1038. If the analysis component 1008 does not encounter an error while creating the correction instruction at 1050, the analysis component, at 1058, can save the correction instruction, or convert it to another format (e.g., generate a code comparison or a corrected code version). After saving or converting the correction instruction at 1058, or sending a problem description at 1038, the method 1000 can end.

Example 11—Example Methods of Training and Using Classifier

Figures 11A, 11B:
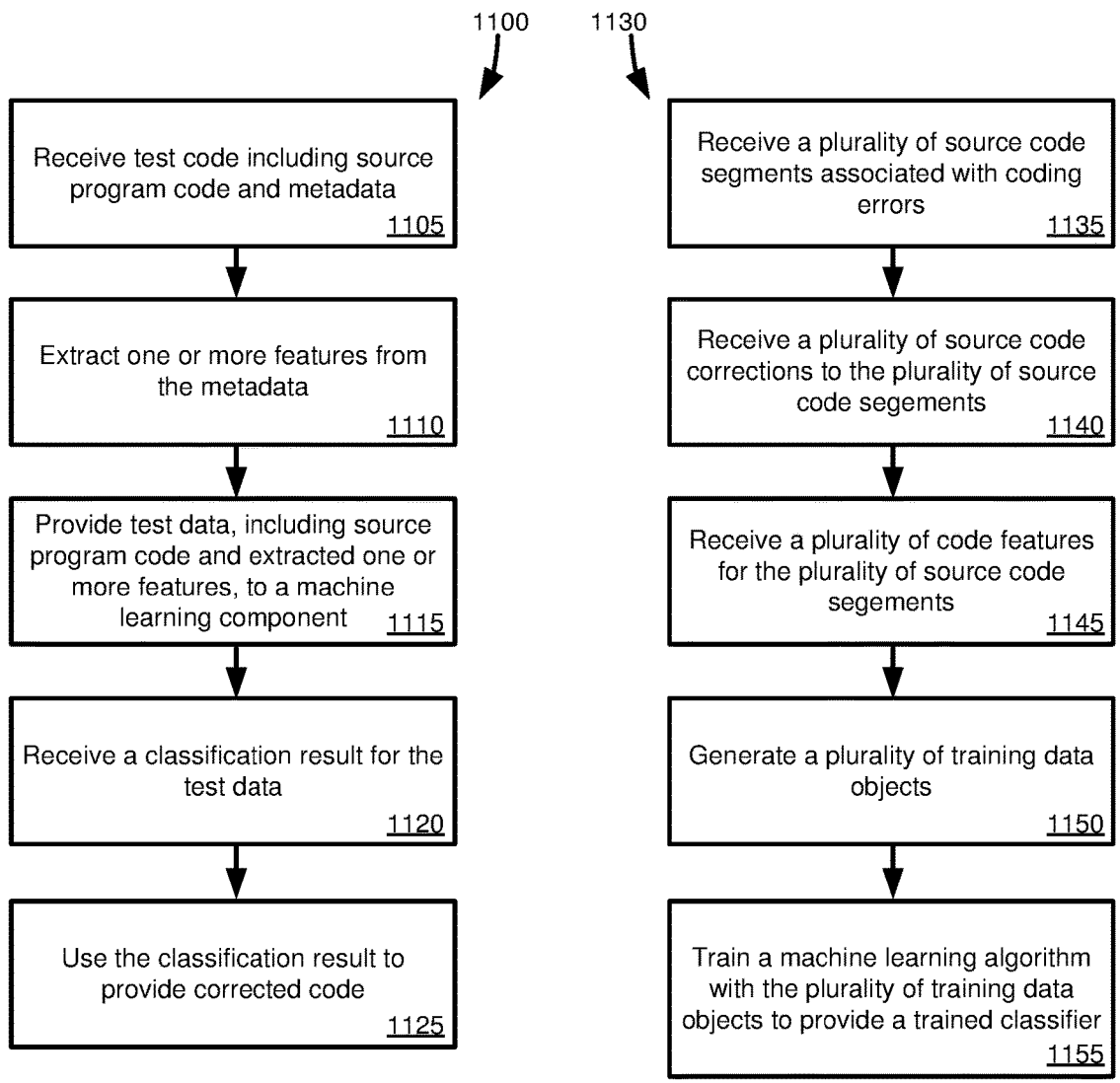
FIG. 11A is a flowchart of an example method using a machine learning component to classify test data and provide corrected code.
FIG. 11B is a flowchart of an example method of training a machine learning algorithm to provide a trained classifier.

FIG. 11A is a flowchart of an example method 1100 of obtaining classification results, such as in the form of corrected code or a code correction (such as a correction instruction) using a trained classifier. At 1105, test code is received that includes source program code and metadata. One or more features are extracted from the metadata at 1110. At 1115, test data is provided to a machine learning component. The test data includes source program code and one or more extracted features. A classification result for the test data is received at 1120. At 1125, the classification results are used to provide corrected code (such by replacing erroneous code with corrected code or applying a code correction, such as in the form of a correction instruction, to provide the corrected code).

FIG. 11B is a flowchart of an example method 1130 of training a classifier based on a machine learning algorithm. At 1135, a plurality of source code segments (e.g., all or a portion of a source code file or another source of source code) are received. The plurality of source code segments are associated with coding errors (e.g., one or more bugs). A plurality of source code corrections to the plurality of source code segments are received at 1140. The source code corrections can be correction instructions. At 1145, a plurality of code features are received for the plurality of source code segments. A plurality of training data objects are generated at 1150, where a training data object include a code segment and its corresponding code correction and a set of features of the plurality of code features. At 1155, a machine learning algorithm is trained with the plurality of training data objects to provide a trained classifier.

Example 12—Computing Systems

Figure 12:
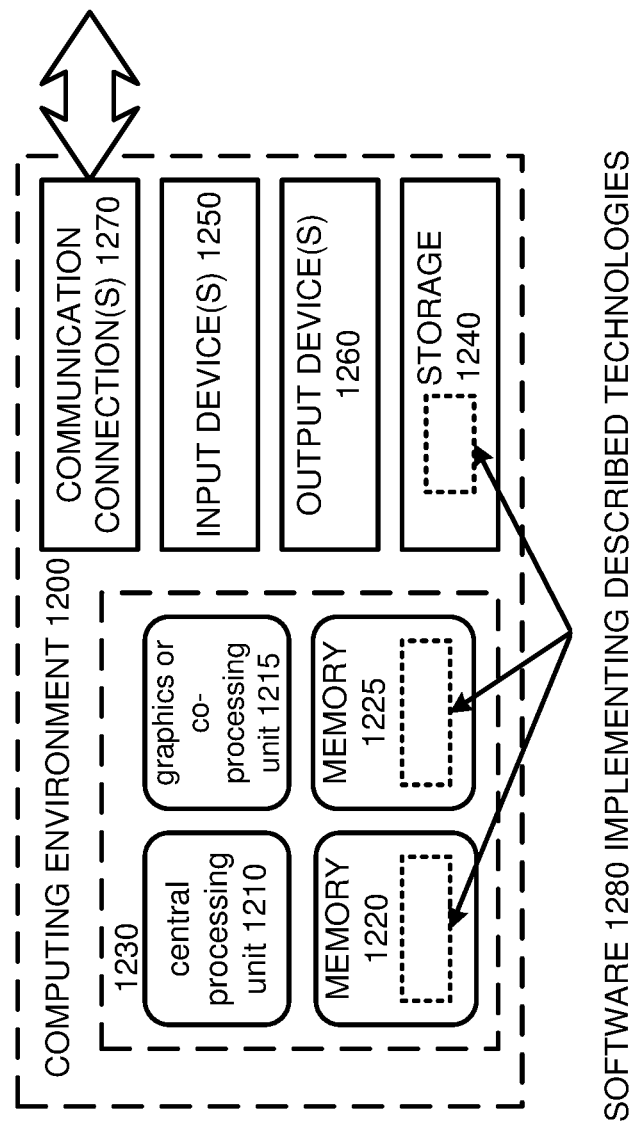
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions, such as for implementing components of the architecture 700 of FIG. 7, including as further described in Examples 1-11. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215.

A computing system 1200 may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13—Cloud Computing Environment

Figure 13:
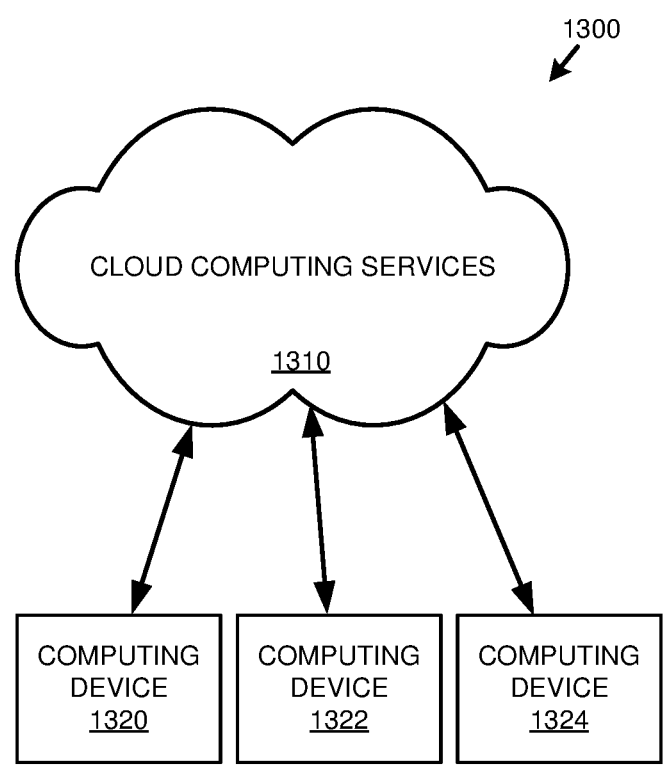
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like).

Example 14—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more non-transitory computer-readable storage media storing computer-executable instructions for causing a computing system to perform processing to generate corrected code, the processing comprising:
   generating a plurality of training data objects, wherein a training data object of the plurality of training data objects comprises a source code segment of a plurality of source code segments being associated with a coding error, a code correction of a plurality of code corrections corresponding to the source code segment, and a set of multiple code features corresponding to the source code segment;
   training a machine learning algorithm with the plurality of training data objects to provide a trained classifier that outputs a code correction in response to an input test data object, the input test data object comprising a source code segment and a plurality of code features;
   receiving test code, the test code comprising source program code and metadata; extracting one or more features from the metadata;
   providing test data, comprising the source program code and the extracted one or more features, to a machine learning component, the machine learning component comprising the trained classifier, the classifier having been trained with a training data set, members of the training data set comprising training source program code, training metadata, and training code corrections, wherein the training metadata comprises a software component identifier, identifying a software component in which given training source program code was located, an object type identifier, identifying a source or formatting of the given training source program code, and an object name, the object name being a file name or programming object name of a software object in which the given training source program code was located;
   receiving a classification result for the test data from the classifier of the machine learning component, the classification result defining one or more operations or actions that can be applied to the test code to provide corrected code; and
   automatically applying at least a portion of the classification result to the test code to provide the corrected code.

2. The one or more non-transitory computer-readable storage media of claim 1, wherein applying at least a portion of the classification result to the test code to provide the corrected code comprises sending the classification result to a computing system running an application to be applied to a software component of the application.

3. The one or more non-transitory computer-readable storage media of claim 1, wherein the classification result comprises a correction instruction, the correction instruction comprising a context block, a delete block, and an insert block.

4. The one or more non-transitory computer-readable storage media of claim 1, wherein the code corrections of the members of the training data set comprise one or more correction instructions, wherein a correction instruction comprising a context block, a delete block, and an insert block.

5. The one or more non-transitory computer-readable storage media of claim 1, wherein the training metadata further comprise metadata consisting of at least one of a release identifier of a program comprising the training source program code and an identifier of a programming language in which the training source program code is written.

6. The one or more non-transitory computer-readable storage media of claim 1, wherein the one or more features extracted from the metadata are an error type or identifier of an error associated with the training source program code.

7. The one or more non-transitory computer-readable storage media of claim 1, the processing further comprising:
executing the corrected code and determining whether a program error occurs.

8. The one or more non-transitory computer-readable storage media of claim 7, the processing further comprising:
determining that a program error occurs; and
submitting the classification result to the classifier as training data.

9. A computing system that implements a code correction system, the computing system comprising:
a memory;
one or more processing units coupled to the memory; and
one or more non-transitory computer readable storage media storing instructions that, when loaded into the memory, cause the one or more processing units to perform operations of:
receiving a plurality of source code segments, code segments of the plurality of source code segments being associated with a coding error;
receiving a plurality of code corrections, wherein a code correction corresponds to a source code segment of the plurality of the source code segments;
receiving a plurality of code features for the plurality of source code segments, wherein sets of multiple code features of the plurality of code features correspond to a source code segment of the plurality of the source code segments;
generating a plurality of training data objects, wherein a training data object of the plurality of training data objects comprises a source code segment of the plurality of source code segments, a code correction of the plurality of code corrections corresponding to the source code segment, and a set of multiple code features corresponding to the source code segment;
training a machine learning algorithm with the plurality of training data objects to provide a trained classifier that outputs a first code correction in response to an input test data object, the input test data object comprising a source code segment and a plurality of code features; wherein the first code correction defines one or more operations or actions that can be automatically applied to code of the input test data object to correct code errors in the code of the input test data object;
receiving test code, the test code comprising source program code and metadata;
extracting one or more features from the metadata;
providing test data, comprising the source program code and the extracted one or more features, to a machine learning component, the machine learning component comprising the trained classifier;
receiving a classification result for the test data, the classification result comprising a result code correction instruction comprising one or more context blocks, delete blocks, and insert blocks; and
automatically applying the classification result to the test code to provide corrected code.

10. The computing system of claim 9, wherein code corrections of the plurality of code corrections comprise one or more correction instructions.

11. The computing system of claim 9, wherein receiving a plurality of code corrections comprises:
receiving a corrected source code segment corresponding to a source code segment of the plurality of source code segments; and
generating differences between the corrected source code segment and the corresponding source code segment.

12. The computing system of claim 11, wherein generating differences comprises generating operations to convert the source code segment to the corrected source code segment.

13. The computing system of claim 12, wherein the operations comprise operations selected from the group consisting of adding one or more lines of source code, deleting one or more lines of source code, and a combination thereof.

14. The computing system of claim 9, wherein receiving the plurality of code features comprising extracting metadata from the plurality of source code segments.

15. The computing system of claim 9, wherein receiving a plurality of code features comprising receiving using input providing at least one code feature of the plurality of code features.

16. The computing system of claim 9, wherein the plurality of code features comprise one or more code features selected from the group consisting of an identifier of a software component associated with a source code segment, an identifier of an object type of an object comprising a source code segment, an object name of an object comprising the source code segment, a product name of application comprising the source code segment, a release identifier of a program comprising the source code segment, an error type or identifier of an error associated with the source code segment, and an identifier of a programming language in which the source code segment is written.

17. The computing system of claim 9, wherein the plurality of code corrections comprise archived correction instructions received from a correction system.

18. The computing system of claim 9, wherein at least a portion of the plurality of code corrections comprises one or more changes to one or more tables of a database system.

19. In a computing system comprising a memory and one or more processors, a method of generating corrected software source code, the method comprising:
receiving a plurality of source code segments, each source code segment being associated with a coding error;
receiving a plurality of code correction instructions, wherein each code correction instruction corresponds to a source code segment of the plurality of the source code segments and comprises one or more context blocks, delete blocks, and insert blocks, where the context, delete, and insert blocks specify operations to transform a source code segment of the plurality of source code segments to corrected source code;

receiving a plurality of code features for the plurality of source code segments, wherein sets of multiple code features of the plurality of code features correspond to source code segments of the plurality of the source code segments;

generating a plurality of training data objects, wherein a training data object comprises a source code segment of the plurality of source code segments, a code correction of the plurality of code corrections corresponding to the source code segment, and a set of multiple code features corresponding to the source code segment;

training a machine learning algorithm with the plurality of training data objects to provide a trained classifier that outputs a code correction in response to an input test data object, the input test data object comprising a source code segment and a plurality of code features;

receiving test code, the test code comprising source program code and metadata; extracting one or more features from the metadata;

providing test data, comprising the source program code and the extracted one or more features, to a machine learning component, the machine learning component comprising the trained classifier;

receiving a classification result for the test data, the classification result comprising a result code correction instruction comprises one or more context blocks, delete blocks, and insert blocks; and automatically applying the classification result to the test code to provide corrected code.

* * * * *